US012585556B2

(12) United States Patent　　(10) Patent No.: US 12,585,556 B2
Sunder et al.　　(45) Date of Patent: Mar. 24, 2026

(54) ACTIVE COMPONENT DRIVEN COMPUTATIONAL SERVER RELIABILITY AND FAILURE PREVENTION SYSTEM

(71) Applicant: INTERNATIONAL BUSINESS MACHINES CORPORATION, Armonk, NY (US)

(72) Inventors: Madhana Sunder, Meridian, ID (US); Christopher Muzzy, Burlington, VT (US); James Mansfield Crafts, Warren, VT (US); Noah Singer, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 17/937,537

(22) Filed: Oct. 3, 2022

(65) Prior Publication Data

US 2024/0111643 A1　　Apr. 4, 2024

(51) Int. Cl.
　G06F 11/00　　(2006.01)
　G06F 11/07　　(2006.01)
　　　　(Continued)

(52) U.S. Cl.
　CPC ...... G06F 11/2025 (2013.01); G06F 11/0793 (2013.01); G06F 11/2035 (2013.01); G06F 11/3006 (2013.01); *G06F 2201/80* (2013.01)

(58) Field of Classification Search
　CPC ............. G06F 11/2025; G06F 11/0793; G06F 11/2035; G06F 11/3006; G06F 11/2028;
　　　　(Continued)

(56) References Cited

U.S. PATENT DOCUMENTS

| 7,233,989 | B2 | 6/2007 | Srivastava |
| 7,401,263 | B2 | 7/2008 | Dubois, Jr. |
| (Continued) | | | |

FOREIGN PATENT DOCUMENTS

| CN | 109582422 | A | | 4/2019 |
| JP | 2010165148 | A | * | 7/2010 |

OTHER PUBLICATIONS

"Component Health Record Evaluation Framework," An IP.com Prior Art Database Technical Disclosure, Authors et. al.: Disclosed Anonymously, IP.com No. IPCOM000222504D, IP.com Electronic Publication Date: Oct. 11, 2012, 6 pages.
(Continued)

*Primary Examiner* — Katherine Lin
(74) *Attorney, Agent, or Firm* — Monchai Chuaychoo; Michael O'Keefe

(57)　　　　ABSTRACT

An approach for managing and minimized failure of one or more devices in a computerized cluster and/or vehicle infrastructure is disclosed. The proactive approach for mitigating such black swan events as it relate to hardware failures (e.g., servers, network, vehicle systems/architecture, etc.). The approach would proactively inactivate "suspect" components (i.e., components that are completely functional in multiple systems) based on component vintage data from systems where components have failed or malfunctioned. A dedicated service is actively updating suspect components and their respective vintages spread across various systems. Furthermore, the approach backups components using different vintages are effectively utilized to avoid complete system failure.

20 Claims, 6 Drawing Sheets

(51) Int. Cl.
  *G06F 11/20* (2006.01)
  *G06F 11/30* (2006.01)

(58) Field of Classification Search
  CPC ............. G06F 11/2033; G06F 11/2041; G06F
  11/3034; G06F 11/3051
  See application file for complete search history.

(56) References Cited

U.S. PATENT DOCUMENTS

| | | | |
|---|---|---|---|
| 7,849,368 | B2 | 12/2010 | Srivastava |
| 8,830,031 | B2 | 9/2014 | Atsutomo |
| 9,600,370 | B2 | 3/2017 | Chiu |
| 10,831,619 | B2 | 11/2020 | Park |
| 11,176,029 | B2 | 11/2021 | Salame |
| 2021/0056001 | A1 | 2/2021 | Dwarampudi |
| 2021/0334168 | A1 | 10/2021 | Kanp |

OTHER PUBLICATIONS

"Hardware Performance Monitoring & Management," SolarWinds, Publish Date: Mar. 4, 2013, 14 pages, <https://www.solarwinds. com/resources/tech-tip/hardware-performance-monitoring-and-management>.
"Method and System for Providing Emergency Backup Services for IoT Devices During an Outage by Learning Critical and/or Important IoT Devices and Services," An IP.com Prior Art Database Technical Disclosure, Authors et. al.: Disclosed Anonymously, IP.com No. IPCOM000257308D, IP.com Electronic Publication Date: Jan. 30, 2019, 5 pages.
Liu et al., "Active Message Oriented Adaptation Middleware for Collaborative Applications in Heterogeneous Environments," IEEE, ICC 2008 Proceedings, pp. 1866-1870.

* cited by examiner

400

401 New component info

402 New component from field

403 Gathering information on suspect components

404 Update status of suspect components

405 Components in system?

406 Continue to monitor

407 Malfunction detected?

YES

NO

408 Flag Component

409 Set Priority

410 Throttle back components

411 Backup component available?

YES

NO

412 Prepare to Share

NEXT PAGE

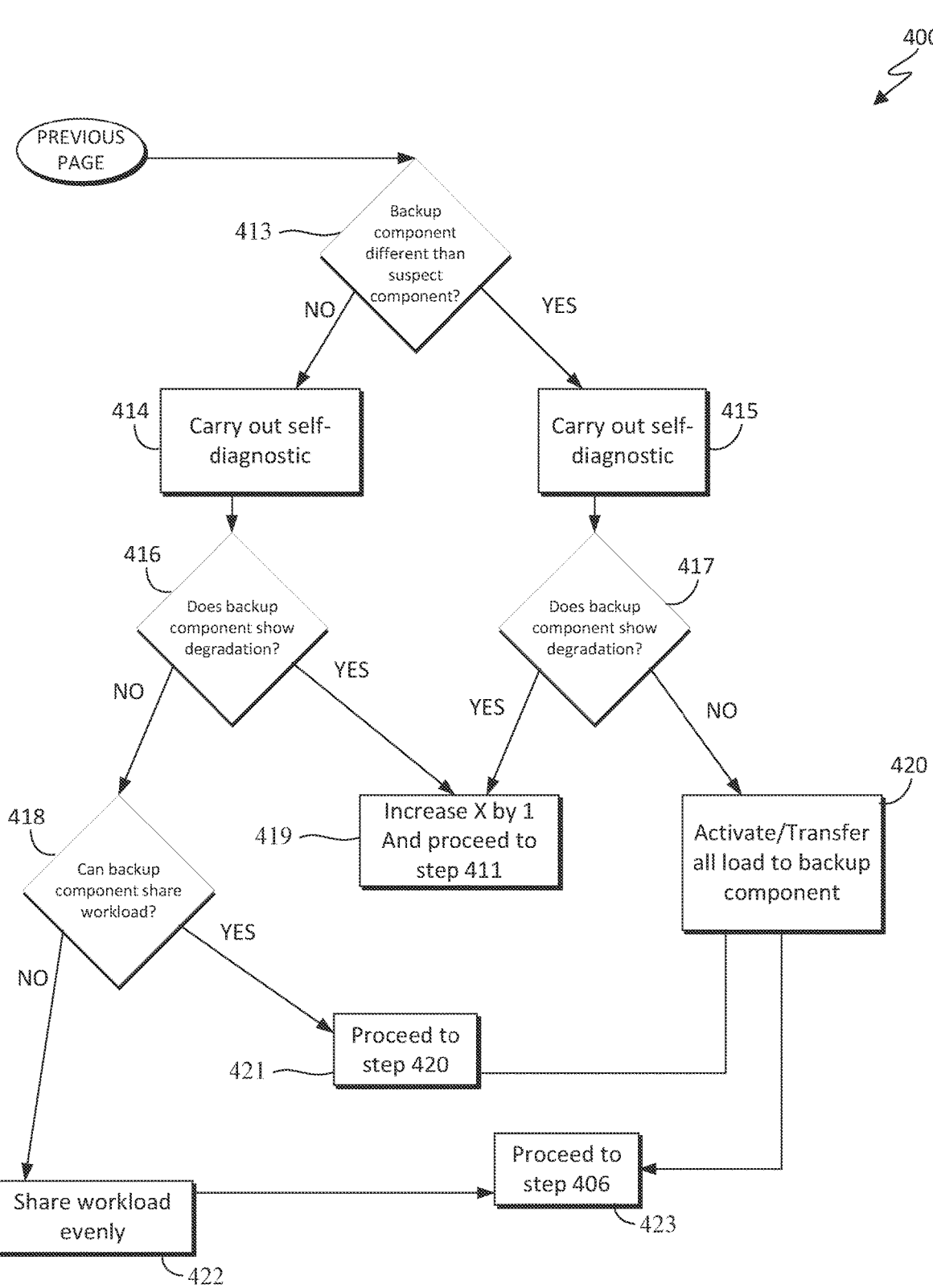
400
FIG. 4 (*CONTINUATION*)

500

502 MEMORY

505 PERSISTENT STORAGE

507 COMMUNICATIONS UNIT

501 PROCESSOR(S)

503 CACHE

504

506 I/O INTERFACE(S)

508 EXTERNAL DEVICE(S)

510 DISPLAY

ACTIVE COMPONENT DRIVEN COMPUTATIONAL SERVER RELIABILITY AND FAILURE PREVENTION SYSTEM

BACKGROUND

The present invention relates generally to managing a distributed network, and more particularly to monitoring the health of servers in a distributed network.

Modern day computer servers rely on a multitude of hardware components and sub-components that need to function 24/7 in a reliable manner. In addition, server manufacturers are forced to keep up with the increased customer driven performance demand by utilizing next generation hardware and this introduces certain hurdles: First, it is challenging to accurately predict component performance over a 10-year period and unwanted interactions, between various server components, and/or server room environment, may occur during the life term of the server; second, server parts suppliers themselves utilize various sub suppliers for components, manufacturing etc. and this introduces variations in terms of actual material sets being used, purity of materials, storage conditions, manufacturing environment etc.; and third, geographic locations and local micro-environments influence component reliability, and it is challenging to reproduce those exact environments, in a lab, for long term testing. Furthermore, black swan related hardware events could shut down an entire system or set of systems across various geographic areas putting our clients at risk for business continuity.

SUMMARY

Aspects of the present invention disclose a computer-implemented method, a computer system and computer program product for managing and minimized failure of one or more devices in a computerized cluster. The computer implemented method may be implemented by one or more computer processors and may include: monitoring a health status of the one or more devices associated with the computerized cluster; determining whether the one or more devices is malfunctioning; in responsive to determining that the one or more devices is malfunctioning, determining whether there are backup components of the one or more devices; in responsive to determining that there are backup components, determining whether the backup components have a different vintage information than the vintage information of the one or more malfunctioning devices; in responsive to determining that the backup components does not have a different vintage than the one or more malfunctioning devices, activating the backup components; and In responsive to determining that there are no backup components, managing the one or more malfunctioning devices.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Figure 1:
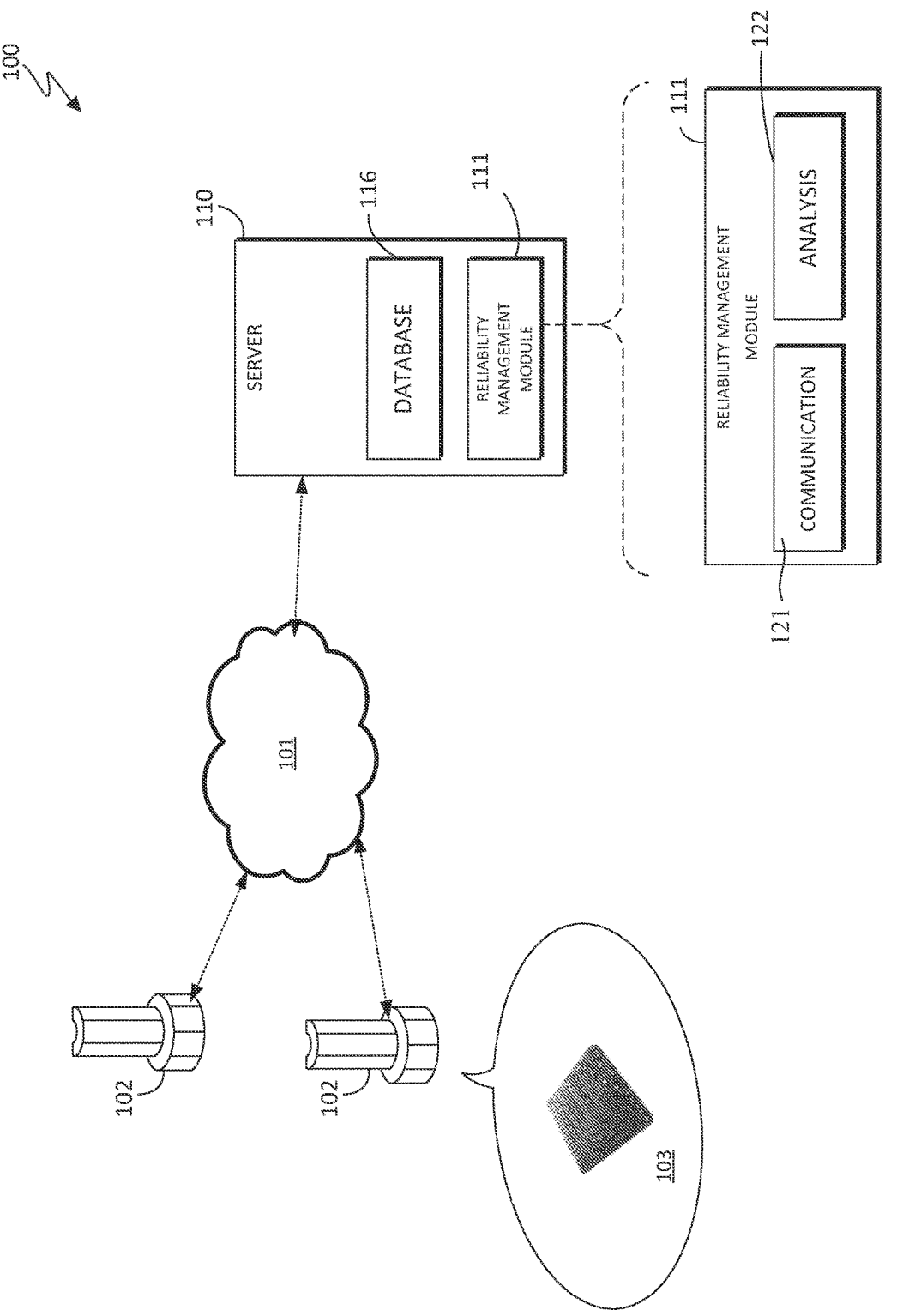
FIG. 1 is a functional block diagram illustrating a high-level overview of the reliability management, designated as 100, in accordance with an embodiment of the present invention.

Modern day computer servers rely on a multitude of hardware components and sub-components that need to function 24/7 in a reliable manner. A black swan related hardware events could shut down an entire system or set of systems across various geographic areas putting our clients at risk for business continuity. Thus, there is a need for a proactive approach to prevent hardware failure in systems that are running 24/7.

Embodiments of the present invention provides a proactive approach for mitigating such black swan events as it relate to hardware failures (e.g., servers, network, etc.). The approach would proactively inactivate "suspect" components (i.e., components that are completely functional in multiple systems) based on component vintage data from systems where components have failed or malfunctioned. A dedicated service is actively updating suspect components and their respective vintages spread across various systems. Furthermore, the approach backups components using different vintages are effectively utilized to avoid complete system failure.

Other embodiments of the present invention may recognize one or more of the following facts, potential problems, potential scenarios, and/or potential areas for improvement with respect to the current state of the art: i) proactively identify and inactivate suspect components in field systems/servers thereby avoiding occurrence of field wide failures; ii) can be utilized in other fields beside computer systems such as vehicles; iii) would enable server businesses to quickly get an understanding of the magnitude and scope of hardware related issues that may arise in the field; iv) in the case of failure analysis and test (F/A), F/A team (i.e., troubleshooting/maintenance equipment team) would be able to quickly obtain an accurate view of field related failure analysis and test work priority, associated hardware vintage information and get the right hardware with the failing vintage. This would drastically enhance our turnaround time; and v) enables businesses to quickly compute the value of a server from a hardware component perspective and use information in pricing server upgrades.

In the current and existing methodology, health monitoring is used only to determine when to switchover to a redundant chip. However, in some embodiments, an approach utilizes monitored health data for all of the listed functions under our novelty section and effectively activates back up components from different vintages to avoid total system failure.

In the current and existing methodology, health monitoring is being done at a server level and individual components are not monitored or tracked. Furthermore, existing techniques do not allow for adjustments within the servers based on the health monitoring. However, in some embodiments, an approach has the capability of making adjustments within the server(s) to extend the life of components based on reliability issues.

It is noted that the above embodiments illustrates the use case applicable to an application server environment (e.g., computerized servers, network servers, etc.). However, other use case can exist for the application of the present invention. The same functionality and capability of reliability management module 111 (described throughout the specifications) can be applied to a vehicle system architecture. For example, in a vehicle environment where there are several electronic items (e.g., circuit level all the way up to larger modules such as ECM, engine control module, etc.) that could fail and render the vehicle inoperable, reliability management module 111 can proactively inactivate "suspect" components (i.e., components that are completely functional in multiple systems) based on component vintage data from the system or activate backup components before the suspect component cause a catastrophic failure to the vehicle (i.e., crashing a vehicle).

In the same example relating to vehicle system, electronic items pertaining to a vehicle architecture can include, but is not limited to, an ECM (engine control module), TCM (transmission control module) and ABS (Anti-lock braking system) module of a vehicle may contain hundreds of electronic devices (e.g., integrated circuit, resistors, relays, etc.). Embodiments (i.e., reliability management module 111) can reside on the ECM and can proactively monitor other vehicular components, such as, the TCM and ABS.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

Generally, the term, "vintage components" typically refers to small devices on a circuit board, such as resistors, inductors, capacitors. However, vintage components can also refer to larger hardware devices (i.e., assembled with resistors, inductors, capacitors, etc.) such as, memory chips, storage devices (e.g., hard drive, flash drive, tape backup drive, etc.), video/graphics card, network cards, network accelerator, CPU, GPU and etc.

However, another secondary meaning for "vintage components" is that the term can refer to primary and/or secondary hardware components. The functionality of when vintage components becomes either a primary or a secondary hardware component is dependent on the configuration on the hardware of the computerized system. Typically, "primary components" denotes one or more devices that are currently being active/activated in a computerized system (e.g., servers, vehicle systems, etc.) while "secondary components" are similar components that provides the same functionality as the primary components that are typically used a backup and/or are inactivate/inactive. For example, a primary component is 1 TB hard drive made by manufacturer X that has a read/write speed of 800 Mb/s and a secondary component is also a 1 TB hard drive made by manufacture Y that has read/write speed of 500 Mb/s. Both 1 TB hard drives (by manufacture X and manufacture Y) performs the same functionality but would not be considered the same vintage but different vintage. It is possible to have two different vintage hardware as primary components, using the previous example, two hard drives manufactured by X and Y, respectively. The backup components of the previous example, could be the same two hard drives, but inactive as backup.

In one embodiment, the term, "vintage information" or just simply, "vintage" refers to the "specifications" (e.g., technical details, physical dimension, electrical properties, etc.) of the vintage components. For example, reusing the previous example regarding the one TB hard drives. The vintage information of the first hard drive made by manufacturer X would constitute one vintage information (e.g., capacity=1 TB, read/write speed 800 Mb/s, MTBF 20,000 hours, etc.). The vintage information of the second hard drive made by manufacturer Y would constitute another vintage information (e.g., capacity=1 TB, read/write speed 500 Mb/s, MTBF=15,000 hours, etc.).

In some embodiments, vintage information can consist of overall hardware component and subcomponent details such as part number, supplier information, year of manufacturing, time spent in storage prior to and after build, storage/environmental conditions, assembly location, assembly issues if any, test details, issues if any during in house testing, field install challenges if any, materials used, material changes etc. Install time stamps, shipment details, returns, part reuse etc. are also a part of the vintage information.

It should be noted that the term, "vintage", "vintages" and "vintage components" may be used interchangeably and all convey the same meaning/definition.

It should be noted that the term, "suspect" and "suspected components" may be used interchangeably and all convey the same meaning/definition.

It should be understood that the Figures are merely schematic and are not drawn to scale. It should also be understood that the same reference numerals are used throughout the Figures to indicate the same or similar parts.

FIG. 1 is a functional block diagram illustrating a reliability management environment 100 in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Reliability management environment 100 includes network 101, server cluster 102, hardware components 103 and server 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, hardware components 103, server cluster 102 and other computing devices (not shown) within reliability management environment 100. It is noted that other computing devices can include, but is not limited to, server cluster 102 and any electromechanical devices capable of carrying out a series of computing instructions.

Server cluster 102 are computerized devices or computing system capable of receiving, sending, and processing data. Server cluster 102 are utilized by an organization to provide various services (e.g., cloud computing, web services, edge computing, etc.) to various users (e.g., consumers, corporate clients, etc.). Server cluster 102 can include mainframes and cloud computing system.

Hardware components 103 are one or more individual hardware components that resides within server cluster 102. Hardware components 103 can included, small devices on a circuit board, such as resistors, inductors, capacitors. Hardware components 103 can also refer to larger hardware devices (i.e., assembled with resistors, inductors, capacitors, etc.) and include memory (e.g., RAM, etc.), CPUs, digital storage, graphics card, network cards, accelerators (e.g., network accelerators, database accelerators, etc.), power supplies and cooling equipment. Server cluster 102 may contain thousands of key hardware components (i.e., 103).

In another embodiment, hardware components can include IC (integrated circuit) level components, such as, but is not limited to, resistors, capacitors, inductors, transistors and other IC related components.

Server cluster 102 and server 110 can be a standalone computing device, a management server, a web server, a mobile computing device, or any other electronic device or computing system capable of receiving, sending, and processing data. In other embodiments, server 110 and server cluster 102 can represent a server computing system utilizing multiple computers as a server system, such as in a cloud computing environment. In another embodiment, server 110 and can be a laptop computer, a tablet computer, a netbook computer, a personal computer (PC), a desktop computer, a personal digital assistant (PDA), a smart phone, or any other programmable electronic device capable of communicating other computing devices (not shown) within reliability management environment 100 via network 101. In another embodiment, server 110 and represents a computing system utilizing clustered computers and components (e.g., database server computers, application server computers, etc.) that act as a single pool of seamless resources when accessed within reliability management environment 100.

Embodiment of the present invention can reside on server 110 or server cluster 102. Server 110 includes reliability management module 111 and database 116.

Reliability management module 111 provides the capability of, but it is not limited to, i) storing and updating vintage and other information from each hardware devices (i.e., hardware component 103), ii) builds and manage an active correlation database with various information (e.g., failing/suspect hardware, number of inactivated components, available back up components, associated vintage, their distribution across individual servers, etc.) from various devices (e.g., server cluster 102, hardware component 103, etc.) and other runtime status (e.g., operating conditions, failure analysis request priority from individual servers, etc.), iii) identifying and labeling suspected (e.g., close to failure or failed, etc.) hardware devices and iv) activating backup components, deactivating failed components or maintaining a balance of devices in case of unavailable or disparate backup components.

It is noted that the same functionality and capability (mentioned above) of reliability management module 111 can be applied to a vehicle system architecture as well.

In the depicted embodiment, reliability management module 111 includes communication submodule 121 and analysis submodule 122.

As is further described herein below, communication submodule 121 of the present invention provides the capability of retrieving vintage information and other data (e.g., field related service information, recalled information, health information, etc.) and send the necessary data to analysis submodule 122 and/or database 113.

In some embodiments, communication submodule 121 can perform other servers and/or hardware devices function such as, but is not limited to, balancing load (e.g., CPU, network, etc.) between individual hardware components or server clusters and throttle back requests or throttle back usage on a hardware components and/or servers, activate certain components and deactivate certain components.

Vintage information consists of overall hardware component and subcomponent details such as part number, supplier information, year of manufacturing, time spent in storage prior to and after build, storage/environmental conditions, assembly location, assembly issues if any, test details, issues if any during in house testing, field install challenges if any, materials used, material changes etc. Install time stamps, shipment details, returns, part reuse etc. are also a part of the vintage information.

The vintage information is either stored in the component locally either using a storage device, barcode or other means. In some embodiments, a bar code reader may be attached to the server and associated vintage data is actively fed to the server during build or service action. In some embodiments, the data may be load into the server using either connected or wireless means or both. It is noted that the individual system can store all vintage information locally related to their key active individual hardware components and their respective back up components (that are vital for 24/7 up time). Furthermore, hardware components and/or configuration of an individual server are typically never shared with another server or cloud.

All field related service information can be actively stored on a system service cloud (i.e., server 110) by individual servers (i.e., server cluster 102). Field related service information can contain data such as, the vintage information of parts being replaced in the field, hardware throttle information, back up component activation information, number of field service calls related to failing hardware, tool down time, repair time etc. In addition, recalled information from suppliers and corporate system F/A teams are also actively fed into the cloud service.

Each server checks their component status against the company service cloud data periodically and is aware of their health status in terms of potential issues that are developing in the field: failing/malfunctioning components, software errors etc. The transmitted hardware health information can be useful for F/A team or for an AI system to determine optimal solution.

In some embodiments, communication submodule 121 can continuously update database 116 with data relating to number of malfunctioning hardware components, unused back up components, active back up components etc. in each server.

In some embodiments, communication submodule 121 of the present invention provides the capability of monitoring the health status of all connected devices (e.g., 102, 103, etc.). Monitoring would include either constant or a user-defined predetermine interval to poll various devices for their health status. In some embodiments, the polling interval of devices can be dynamically determined by an AI logic, wherein the AI logic may use the following criteria, i) similar but not exactly the same devices that failed in other server clusters, ii) same exact device that failed in another server cluster and/or iii) a predetermined percentage of the total MTBF (mean-time between failure), as rated by the manufacturer.

As is further described herein below, generally, analysis submodule 122 of the present invention provides the capability of receiving various information (e.g., vintage information, server information, corporate F/A team, etc.) and determining (via machine learning) one or more optimal solutions to keep the servers running without downtime or reduced capacity.

The following are some examples illustrating the capability of reliability management module, through analysis submodule 122:

First example, the servers are continuously ranked from worst affected to least affected, taking into consideration the number of suspect components, activated back up components, available inactivated functional back up components, throttled components, number and priority level of hardware failure analysis requests etc. on a "dedicated service" such as a server service cloud;

Second example, an Artificial intelligence (AI) unit may be utilized to keep track of affected systems and may issue alerts to the corporate equipment service team to take actions if a criteria, matching a certain number of affected components, is met. The AI unit can quickly draw a correlation between failed component vintage, server geographic location, server room environmental conditions etc. In another embodiment, the AI unit can issue a preliminary report to the F/A team to enable them to start working, on the challenge, prior to shipment of suspect components.

Third example, embodiment may actively select parts having a certain vintage for a hardware F/A analysis based on the following criteria: number of similar components affected in servers in the field, number and priority level of F/A work requests from individual servers, and number of left over back up components etc. Service teams are directed to only servers chosen by the dedicated service for replacing/shipping suspect/malfunctioning hardware; and Fourth example, embodiment can also help to identify and recommends which vintage of replacement hardware need to be used during field replacements. Alternatively, a backup component (preferred and best method), belonging to a different vintage, may be activated and the suspect component is made non-functional again.

Factors and/or criteria that can be relied on/utilized by analysis submodule 122, via AI/machine learning, to make certain decisions relating to activating and deactivating servers and/or hardware components can include, but is not limited to, i) utilizing a user pre-defined threshold factor for determining when a hardware component becomes a suspect component, iii) sharing workloads (between, the suspected and back up) if a backup component belonging to a different vintage is not available component, v) assigning numerical identifiers to key hardware components that are suspect as well as ones that have malfunctioned, vi) making inactivated suspect components active again if they are determined to be non-suspect based on numerical identifiers, vii) setting a priority level on component F/A request using numerical identifiers and predefined criteria and viii) updating dynamically and continuously the numerical identifiers based on events that may occur in the field and in a certain system of interest.

In some embodiments, analysis submodule 122 has the ability to inactivate key suspect components where each server gets updates on developing issues in the field. This can occur even after that suspect components by activating their related back up component even though the suspect component may be fully functional in that server.

In some embodiments, analysis submodule 122 of the present invention provides the capability of communicating and interacting with users based on the proposed solution from analysis submodule 122, wherein the users can select from different solutions for the system to implement. It is noted that, depending on the embodiment's configuration, a user selection may not be required and the system can automatically make decisions independently (i.e., without a user).

Database 116 is a repository for data used by reliability management module 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within reliability management environment 100, provided that Reliability management module 111 has access to database 116. Database 116 may store information associated with, but is not limited to, knowledge corpus relating to, field related service information, recalled information, health information, vintage information, server hardware information, and network related information, applications installed with optimal hardware settings, failure information of vintage components on other servers.

Figures 2A, 2B:
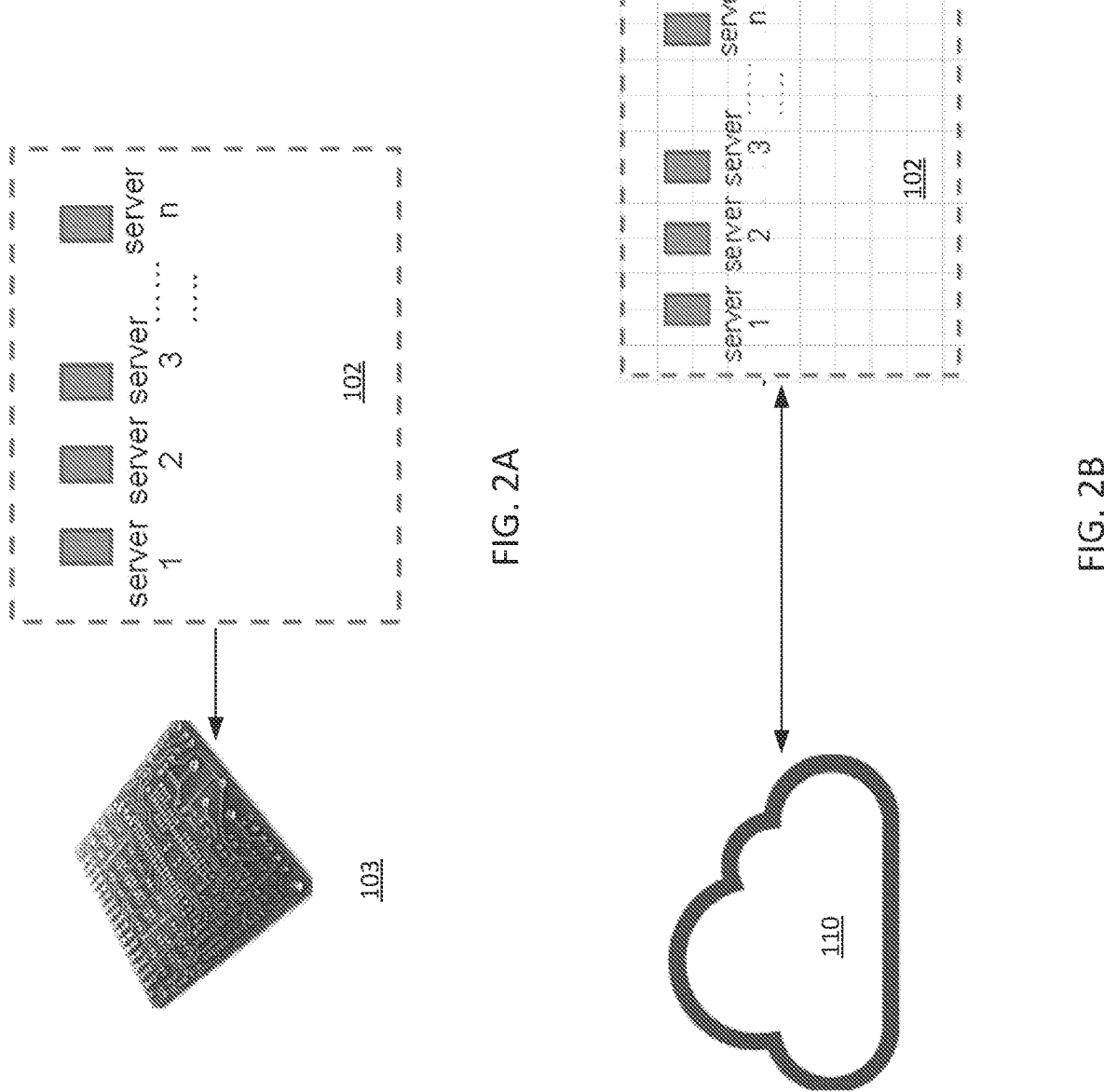
FIG. 2A is a functional block diagram illustrating the interactions between server cluster 203 and hardware components 103, in accordance with an embodiment of the present invention.
FIG. 2B is a functional block diagram illustrating the interactions between server cluster 203 and server 110, in accordance with an embodiment of the present invention.

FIG. 2A is a functional block diagram illustrating the interactions between server cluster 203 and hardware components 103, in accordance with an embodiment of the present invention. Each server may contain thousands of key hardware components. Detailed vintage information of each hardware component used in a server is stored locally within that server and it typically not shared with another server or the cloud.

FIG. 2B is a functional block diagram illustrating interactions between server cluster 203 and hardware components 103, wherein vintage information can either be stored in the component locally, such as, either using a storage device, a barcode scanner or other means. In some embodiments, a bar code reader may be attached to the server and associated vintage data is actively fed to the server during build or service action. In another embodiment, the date may be load into the server using either connected or wireless means or both.

Figure 3:
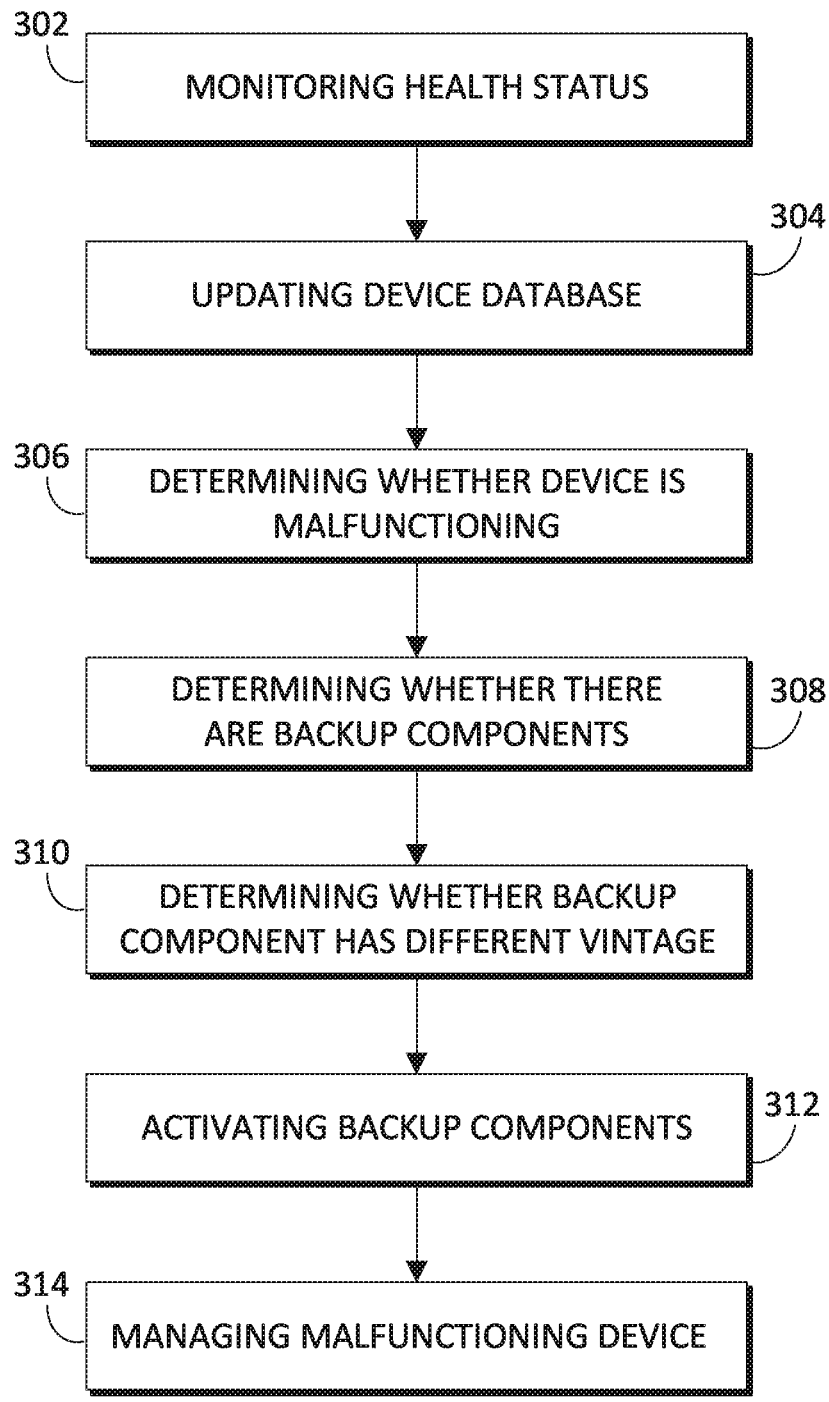
FIG. 3 is a high-level flowchart illustrating the operation of reliability management module 111, designated as 300, in accordance with an embodiment of the present invention.

FIG. 3 is a high-level flowchart illustrating the operation of reliability management module 111, designated as 300, in accordance with an embodiment of the present invention.

Reliability management module 111 monitors a health status (step 302). In an embodiment, reliability management module 111, through communication submodule 121, receives health data from devices (e.g., 103 and/or 102). For example, reliability management module 111 can request for an initial status update from each device residing in a given server cluster and can continually poll based on a predetermine interval.

Reliability management module 111 updates a device database (step 304). In an embodiment, reliability management module 111, through communication submodule 121 and/or communication submodule 121, updates the device database (i.e., 116) with data from devices (e.g., 103 and/or 102). For example, if there are new hardware or failed hardware, this information is updated in a master database.

Reliability management module 111 determines whether the one or more devices is malfunctioning (step 306). In an embodiment, reliability management module 111, through communication submodule 121, receives health data from devices (e.g., 103 and/or 102) and determines if the one or more devices is a "suspect" wherein the component has reached a suspect threshold (e.g., predetermined suspect threshold and factors). A suspect means that the component has either i) has completely failed or ii) is a closed to failure (based on historical data, MTBF, etc.).

There are several existing method to determine if a device has completely failed, such as, i) no reply after several polls/ping to the device and ii) response from nearby devices stating that the "suspect" device(s) have failed.

For determining if the component is closed to failure or possibly may fail in the near future, this can be based on a predetermined threshold and factors. For example, a suspect threshold range can be from zero to 10, where 10 is the most critical level. Thus, a suspect threshold value between zero to 4 can be designated as "low" criticality, range of four to six is designated as "medium" and seven to 10 is "critical".

One factor that can influence the value of the suspect threshold is the criticality of that component as it relates to the entire server. For example, if that particular component were to fail then this would affect to the entire server and therefore, the suspect threshold value is set to 9.

Other factors with some possible assigned suspect threshold level value is listed in Table A. For example, an internal data showing a component of the exact same vintage that had already failed out in the field (this might increase the level more than some other data). Other factors can include, i) be that an information from the supplier of the component showing a discovered manufacturing issue, ii) information on the assembly of the actual server with the components, possible failures which are under investigation, etc. It is noted that the factors (include Table A) illustrates possible suspect threshold value and that the user can change the value based on their need and unique environment.

TABLE A

| Item # | Criteria/Factors | Suspect Level |
|--------|------------------|---------------|
| 1 | Critical part of the server | 9 |
| 2 | Same piece have failed in other environment | 6 |
| 3 | Supplier information showing manufacturer issues | 4 |

It is further noted that one server cluster may contain thousands of components that may be critical or not, a weighted average can be used if user decides that a two digit suspect threshold is used (i.e., zero to ten). For example, if there are ten critical components in one server then each of those critical components can also be assigned a "weight" based on their criticality and the entire suspect value for each component would be combined and compared against a suspect threshold (i.e., using item number 2 and item 3 from Table A for one server, the value as calculated as 0.6×6+ 0.4×4=5.2, deemed medium level).

Similarly, a component could be change from suspect to non-suspect in the same manor based on additional positive data/events. For example, if the failure (same device that failed in the field) was determined to be related to something else, additional studies show very low likelihood of failure, etc. then that same component in the current server can be "downgraded" to a lower level.

Reliability management module 111 determines whether there are backup components of the one or more devices (step 308). In an embodiment, reliability management module 111, through communication submodule 121, determines if there are any existing devices/components with similar functionality as the suspect device. If there are backup components then embodiment proceeds to the next step. Otherwise, if there are no backup components, then embodiment can take action such as, throttling back the suspect component (if it has not already failed), throttle back other components until a technician can replace the suspect component or balance workload between existing components.

Reliability management module determines whether the backup components have a different vintage than from the one or more malfunctioning devices (step 310). In an embodiment, reliability management module 111, retrieves information from the database relating to the backup components and the suspect components and compares the data to determine if there are differences. Any existing comparison techniques can be used, such as vector-based comparison and text-based comparison.

Furthermore, reliability management module 111, through analysis submodule 122, analyzes all relevant data (e.g., health status of devices, field logs of devices, MTBF of device, etc.) and determines, via machine learning/AI, the best solution to keep the servers running with minimal disruption and downtime. For example, based on the data, reliability management module 111 determine the best solution in this scenario is to activate the backup components.

Reliability management module 111, activates the backup components (step 312). In an embodiment, after determining the best solution from the prior step, reliability management module 111, through communication submodule 121, activates the backup components. However, if there are no backup components available then reliability management module 111 manages the one or more malfunctioning devices (step 314) instead. This would involve, depending on the optimal solution already determined by analysis submodule 122, designating existing components to balance the workload or call upon other devices to work at 100% capacity (it is assumed that most devices in a server environment isn't running at 100% capacity all the time).

It is noted that most of the processes performed by reliability management module 111 is without any user interaction. However, if there is a predetermined threshold and/or some user interaction, embodiment, reliability management module 111 can alert users and request a response to various decisions. For example, if there are no backup components and the servers can only run for 30 mins while using a balance configuration, reliability management module 111 may alert a user maintenance team of this fact and possible suggest new hardware swap before the expiration of 30 mins. In another example, reliability management module 111 may request a user to select a backup component that has a different vintage than the suspect or failed component.

Figure 4:
FIG. 4 is another high-level flowchart illustrating the operation of reliability management module 111, designated as 400, in accordance with another embodiment of the present invention.

FIG. 4 is another high-level flowchart illustrating the operation of reliability management module 111, designated as 400, in accordance with another embodiment of the present invention.

The process starts at step 401 and step 402. There are a few counters and abbreviations that will be used to explain the steps; some may involve pseudo-code and/or algorithm. For example, C, will be designated as "component type", N is designated as number of incident events reported from the field for a component of certain vintage, X is a number of inactivated/malfunctioning components and B is a number of functional unused back up components.

Steps 401 (new component supplier information on reliability, recalls, F/A, continued testing, etc.) and 402 (new component data from systems in the field) involves transmitting information to reliability management module 111 (step 403). In step 403, a dedicated service (part of reliability management module 111) gathers information on suspect component and transfer to a system (i.e., server cluster 102).

Step 403 interacts with step 404, which involves updating the status of suspect components using vintage information. If the suspect component is being changed to non-suspect, then decrease the value of N by 1 and switch over to the main components if N=0.

Step 405 is a decision step by reliability management module 111 to determine whether the components from the prior steps are located in the "system". If the components are in the system (step 408) then it is flagged (i.e., assigned an additional identifier, X). For example, $C_x$ and prepare to inactivate component, X=1, 2, 3 . . . and update X from the previous value.

If the component is not in the system then embodiment continue to monitor (step 406) internal components and transmit information on number of suspect, malfunctioning components, associated vintage, remaining unused backup components, F/A work priority, etc. to dedicated service.

Step 407 is a decision to determine whether a malfunction is detected or not. If there is a detected malfunction then return to step 408. If there is not a malfunction detected then return to step 406.

Step 409 involves the activity of, setting priority for F/A work to the lowest level when N=3. Other priority level, such as, medium is set when N=6 and high priority occurs when N is greater than 9 or if X=1. The highest priority occurs when N is ≥10 or if $C_b$=0 or if X≥2. The final function of step 409 is to transmit priority request to dedicated service.

Step 410 involves the activity of, i) throttling back the malfunctioning/suspect components, ii) transmitting vintage information, iii) setting F/A priority to highest level and iv) initiating field service call to replace the part.

Step 411 determines if there is a backup component available. If there are backup component available then proceed to step 412. Otherwise, if there no backup component available then proceed back to step 410.

Step 412 involves the preparation to share the necessary information for activating backup components.

Step 413 involves a decision on determining whether the backup component have the same vintage from the suspect component. If the backup component does not have, the same vintage (i.e., different components) then proceed to step 415. If the backup component does have the same vintage then proceed to step 414.

Step 414 and step 415 are similar in activity. The activity involves carrying out a self-diagnostic check on the backup component.

Step 416 and step 417 are similar in decision activity. The decision activity is to determine whether the backup components shows any signs of degradation or malfunction.

For step 416, if the backup components does show signs of degradation then it proceeds to step 418. Otherwise, the process will proceed to step 419.

For step 417, if the backup components does show signs of degradation then it proceeds to step 419. Otherwise, the process will proceed to step 420.

Step 418 involves decision of determining whether the backup component share a workload with the suspect component.

Step 419 involves the activity of increasing X by 1, updating $C_b$ and proceeding back to step 411.

Step 420 involves the activity of, activating/transferring all load to backup component, updating the number of unused backup components (i.e., $C_b$).

Step 421 involves the activity of merely proceeding back to step 420.

Step 422 involves the activity of sharing the workload evenly between the backup and suspect component if load sharing is allowed. The next activity is to update the number of unused backup components (i.e., $C_b$).

Step 423 involves the activity of merely proceeding back to step 406.

Figure 5:
FIG. 5 depicts a block diagram, designated as 500, of components of a server computer capable of executing the reliability management module 111 within the reliability management environment 100, in accordance with an embodiment of the present invention.

FIG. 5, designated as 500, depicts a block diagram of components of reliability management module 111 application, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

FIG. 5 includes processor(s) 501, cache 503, memory 502, persistent storage 505, communications unit 507, input/output (I/O) interface(s) 506, and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data (e.g., software and data ×10) used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Reliability management module 111 can be stored in persistent storage 505 for access and/or execution by one or more of the respective processor(s) 501 via cache 503.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data (e.g., Reliability management module 111) used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Program instructions and data (e.g., Reliability management module 111) used to practice embodiments of the present invention can be stored on such portable computer readable storage media and can be loaded onto persistent storage 505 via I/O interface(s) 506. I/O interface(s) 506 also connect to display 510.

Display 510 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for managing and minimized failure of one or more devices in a computerized cluster, the computer-implemented method comprising:

monitoring a health status of the one or more devices associated with the computerized cluster;

determining whether the one or more devices is malfunctioning;

in responsive to determining that the one or more devices is malfunctioning, determining whether there are backup components of the one or more devices;

in responsive to determining that there are backup components, determining whether the backup components have a different vintage information than the vintage information of the one or more malfunctioning devices;

in responsive to determining that the backup components does not have a different vintage than the one or more malfunctioning devices, activating the backup components; and in responsive to determining that there are no backup components, managing the one or more malfunctioning devices.

2. The computer-implemented method of claim 1, wherein monitoring the health status further comprising:

receiving device data from the one or more devices, wherein device data comprises of connectivity status and operational status; and updating a device database based on the received data, by changing suspect identifier associated with the one or more devices from a suspect designation to a non-suspect designation and vice versa.

3. The computer-implemented method of claim 1, wherein determining whether there are backup components of the one or more devices further comprising:

searching the device database;

identifying whether the backup components resides in the computerized cluster; and responsive to identifying that the backup components does reside in the computerized cluster, identifying if the backup components are active or inactive based on connectivity.

4. The computer-implemented method of claim 1, wherein determining whether the backup components have a different vintage than from the one or more malfunctioning devices further comprising:

retrieving a list from the device database containing the one or more devices; and comparing the vintage information of the one or more malfunctioning devices against the vintage information of the one or more backup components.

5. The computer-implemented method of claim 1 further comprising:

in responsive to determining that the backup components is the same vintage as the one or more malfunctioning devices, activating the backup components, wherein the backup components can share the workload.

6. The computer-implemented method of claim 1, wherein updating the device database further comprising:

updating the health status in the device database by changing the suspect identifier associated with the one or more devices from a suspect designation to a non-suspect designation and vice versa.

7. The computer-implemented method of claim 1 further comprising:

selecting the one or more devices with the suspect identifier with the suspect designation for failure analysis and test work based on active component vintage data from a field.

8. A computer program product for managing and minimized failure of one or more devices in a computerized cluster further comprising:

one or more computer readable storage media having computer-readable program instructions stored on the one or more computer readable storage media, said program instructions executes a computer-implemented method comprising the steps of:

monitoring a health status of the one or more devices associated with the computerized cluster;

determining whether the one or more devices is malfunctioning;

in responsive to determining that the one or more devices is malfunctioning, determining whether there are backup components of the one or more devices;

in responsive to determining that there are backup components, determining whether the backup components have a different vintage information than the vintage information of the one or more malfunctioning devices;

in responsive to determining that the backup components does not have a different vintage than the one or more malfunctioning devices, activating the backup components; and in responsive to determining that there are no backup components, managing the one or more malfunctioning devices.

9. The computer program product of claim 8, wherein monitoring the health status further comprising:

receiving device data from the one or more devices, wherein device data comprises of connectivity status and operational status; and updating a device database based on the received data, by changing suspect identifier associated with the one or more devices from a suspect designation to a non-suspect designation and vice versa.

10. The computer program product of claim 8, wherein determining whether there are backup components of the one or more devices further comprising:

searching the device database;

identifying whether the backup components resides in the computerized cluster; and responsive to identifying that the backup components does reside in the computerized cluster, identifying if the backup components are active or inactive based on connectivity.

11. The computer program product of claim 8, wherein determining whether the backup components have a different vintage than from the one or more malfunctioning devices further comprising:

retrieving a list from the device database containing the one or more devices; and comparing the vintage information of the one or more malfunctioning devices against the vintage information of the one or more backup components.

12. The computer program product of claim 8, further comprising:

in responsive to determining that the backup components is the same vintage as the one or more malfunctioning devices, activating the backup components, wherein the backup components can share the workload.

13. The computer program product of claim 8, wherein updating the device database further comprising:

updating the health status in the device database by changing the suspect identifier associated with the one or more devices from a suspect designation to a non-suspect designation and vice versa.

14. The computer program product of claim 8, further comprising:

selecting the one or more devices with the suspect identifier with the suspect designation for failure analysis and test work based on active component vintage data from a field.

15. A computer system for managing and minimized failure of one or more devices in a computerized cluster, the computer system comprising:

one or more computer processors;

one or more computer readable storage media;

one or more computer readable storage media having computer-readable program instructions stored on the one or more computer readable storage media for execution by at least one of the one or more computer processors, said program instructions executes a computer-implemented method comprising the steps of:

monitoring a health status of the one or more devices associated with the computerized cluster;

determining whether the one or more devices is malfunctioning;

in responsive to determining that the one or more devices is malfunctioning, determining whether there are backup components of the one or more devices;

in responsive to determining that there are backup components, determining whether the backup components have a different vintage information than the vintage information of the one or more malfunctioning devices;

in responsive to determining that the backup components does not have a different vintage than the one or more malfunctioning devices, activating the backup components; and in responsive to determining that there are no backup components, managing the one or more malfunctioning devices.

16. The computer system of claim 15, wherein monitoring the health status further comprising:

receiving device data from the one or more devices, wherein device data comprises of connectivity status and operational status; and updating a device database based on the received data, by changing suspect identifier associated with the one or more devices from a suspect designation to a non-suspect designation and vice versa.

17. The computer system of claim 15, wherein determining whether there are backup components of the one or more devices further comprising:

searching the device database;

identifying whether the backup components resides in the computerized cluster; and responsive to identifying that the backup components does reside in the computerized cluster, identifying if the backup components are active or inactive based on connectivity.

18. The computer system of claim 15, wherein determining whether the backup components have a different vintage than from the one or more malfunctioning devices further comprising:

retrieving a list from the device database containing the one or more devices; and comparing the vintage information of the one or more malfunctioning devices against the vintage information of the one or more backup components.

19. The computer system of claim 15, further comprising:

in responsive to determining that the backup components is the same vintage as the one or more malfunctioning devices, activating the backup components, wherein the backup components can share the workload.

20. The computer system of claim 15, wherein updating the device database further comprising:

updating the health status in the device database by changing the suspect identifier associated with the one or more devices from a suspect designation to a non-suspect designation and vice versa.

* * * * *